(12) United States Patent
Li et al.

(10) Patent No.: US 10,860,739 B2
(45) Date of Patent: Dec. 8, 2020

(54) ENCRYPTION OF MEDIA BASED ON CONTENT

(71) Applicant: Lenovo (Singapore) Pte. Ltd., Singapore (SG)

(72) Inventors: Scott Wentao Li, Cary, NC (US); Russell Speight VanBlon, Raleigh, NC (US); David Rivera, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/568,621

(22) Filed: Dec. 12, 2014

(65) Prior Publication Data
US 2016/0171239 A1    Jun. 16, 2016

(51) Int. Cl.
| H04L 9/00 | (2006.01) |
| G06F 21/62 | (2013.01) |
| H04W 12/00 | (2009.01) |
| H04L 29/06 | (2006.01) |
| H04W 12/08 | (2009.01) |
| H04L 29/08 | (2006.01) |

(52) U.S. Cl.
CPC ...... *G06F 21/6245* (2013.01); *G06F 21/6254* (2013.01); *H04W 12/0013* (2019.01); *H04L 63/04* (2013.01); *H04L 63/0861* (2013.01); *H04L 67/1097* (2013.01); *H04L 67/18* (2013.01); *H04L 2463/061* (2013.01); *H04W 12/08* (2013.01)

(58) Field of Classification Search
CPC ...................................... G06F 21/10
USPC ........................................................... 726/26
See application file for complete search history.

(56) References Cited

U.S. PATENT DOCUMENTS

| 7,526,653 | B1 * | 4/2009 | Vogel | G06F 21/32 382/115 |
| 7,612,805 | B2 * | 11/2009 | Solomon | G02B 27/0025 348/208.11 |
| 8,063,929 | B2 * | 11/2011 | Kurtz | H04N 7/147 348/14.08 |
| 2007/0210937 | A1 * | 9/2007 | Smith | G08G 1/0962 340/995.1 |
| 2008/0189625 | A1 * | 8/2008 | Zuta | H04N 1/32128 715/753 |
| 2012/0059940 | A1 * | 3/2012 | Liao | H04L 67/1095 709/227 |
| 2015/0106623 | A1 * | 4/2015 | Holman | H04L 63/0457 713/171 |
| 2015/0121535 | A1 * | 4/2015 | Fiss | H04N 1/32101 726/26 |
| 2016/0285785 | A1 * | 9/2016 | Thye | G06Q 30/04 |

* cited by examiner

Primary Examiner — Christopher J Brown
(74) Attorney, Agent, or Firm — Ference & Associates LLC

(57) ABSTRACT

One embodiment provides a method, including: accessing, on a mobile end user device, a media file; processing, using a processor of the mobile end user device, the media file to characterize the media file; detecting, using the processor, at least one privacy-sensitive characteristic of the media file; and setting an indicator, using the processor, denoting the media file as privacy-sensitive prior to permitting the media file to be stored on a cloud account device. Other embodiments are described and claimed.

14 Claims, 3 Drawing Sheets

ENCRYPTION OF MEDIA BASED ON CONTENT

BACKGROUND

Information handling devices ("devices"), for example cell phones, smart phones, tablet devices, laptop computers, and the like permit users to create, access and store a variety of different media on their mobile devices. The media (collectively referred to herein simply as media or media file) may include, for example, pictures or images, videos, audio content, text or other documents, etc.

As a matter of convenience and/or for reliable backup storage, mobile operating systems typically offer an option to synchronize media to a remote (cloud) storage location. Moreover, many third party applications offer such remote storage functionality, e.g., as a downloadable application that assists the user in providing cloud based storage for locally stored media. Thus, either by default or via user opt-in, users may back up or synchronize their media to the cloud using existing device and/or third party services.

BRIEF SUMMARY

In summary, one aspect provides a method, comprising: accessing, on a device, a media file; processing, using a processor of the device, the media file to characterize the media file; detecting, using the processor, at least one privacy-sensitive characteristic of the media file based on the processing; and setting an indicator, using the processor, denoting the media file as privacy-sensitive.

Another aspect provides a device, comprising: a network communication device for communicating with a networked device; a processor operatively coupled to the network communication device; a memory that stores instructions executable by the processor to: access, on the device, a media file; process the media file to characterize the media file; detect at least one privacy-sensitive characteristic of the media file based on processing the media file; and set an indicator denoting the media file as privacy-sensitive.

A further aspect provides a product, comprising: a storage device having code stored therewith, the code being executable by a processor of a device and comprising: code that accesses, on a device, a media file; code that processes the media file to characterize the media file; code that detects at least one privacy-sensitive characteristic of the media file based on the processing; and code that sets an indicator, using the processor, denoting the media file as privacy-sensitive.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
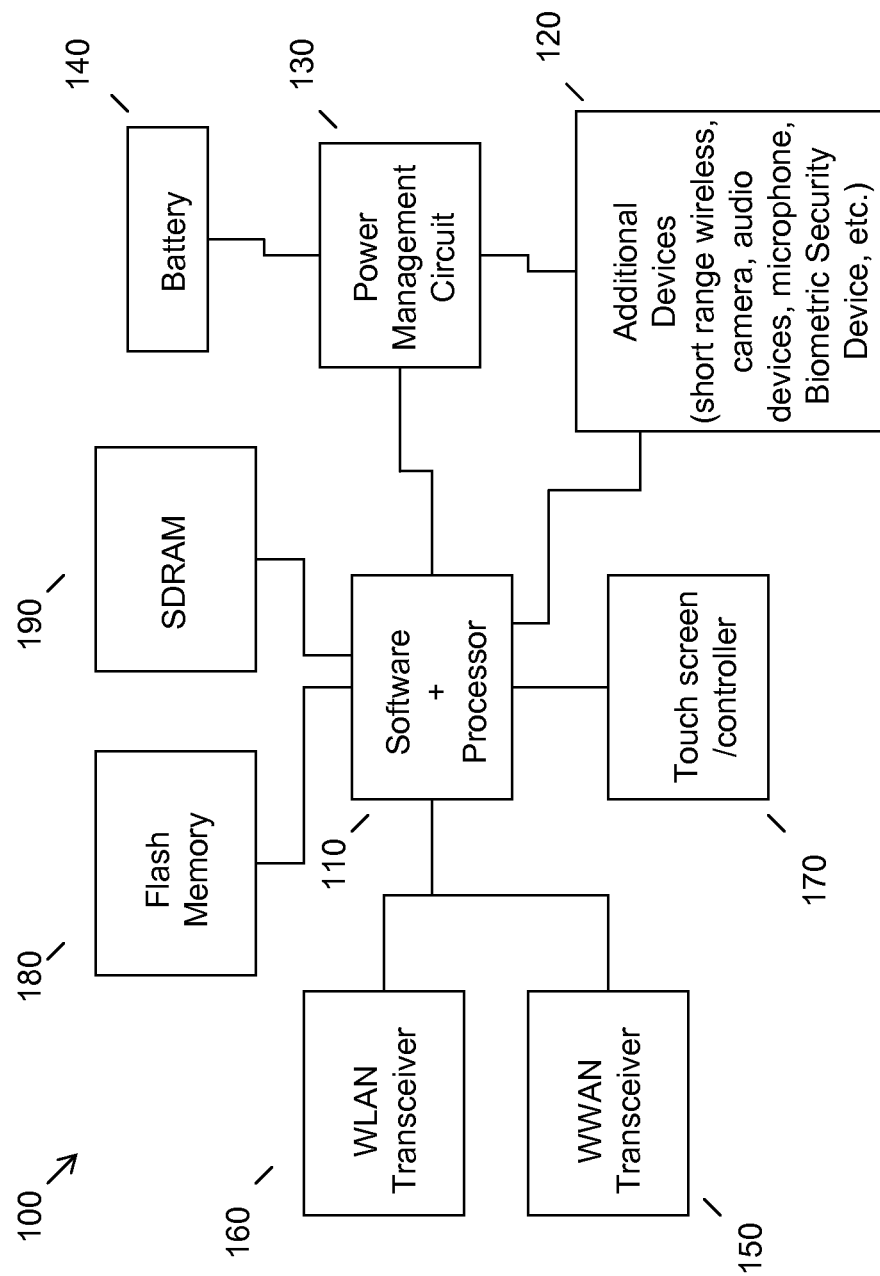
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Current smartphone operating systems (OS's) (e.g., IOS operating system, ANDROID operating system, and WINDOWS PHONE operating system) will automatically synchronize (copy to remote storage) media, e.g., pictures, videos, for example to cloud based storage where this media can be accessed anywhere. Typically this synchronizing is a one-size-fits all approach, i.e., either all or none of the media is synchronized to cloud storage. A recent high profile celebrity photo leak demonstrates that this model suffers some significant technical issues.

One technical issue, by way of example, is that while on-device security is increasing, e.g., via use of biometric devices such as fingerprint readers, the security applied to cloud accounts tends to lag behind, e.g., use of traditional alpha-numeric passwords. A default (or even blanket opt-in, i.e., applied to all media) automatic synchronization process applied to all user media or media types (e.g., all pictures, all video, all contents of a given folder or storage location, etc.) leads to privacy issues, e.g., if the cloud account password is compromised. IOS is a registered trademark of Apple, Inc. in the United States and other countries. ANDROID is a registered trademark of Google, Inc., in the United States and other countries. WINDOWS PHONE is a registered trademark of Microsoft Corp. in the United States and other countries.

Users may turn off automatic synchronization on their devices. However, in this case no media will be backed up. Users might also attempt to manually select certain on-device files for synchronization or manually encrypt/obfuscate media resident on their devices, but such approaches prove to be quite time consuming.

According to an embodiment, media (e.g., pictures and videos, but also documents or other files of interest) are automatically encrypted or obfuscated cryptographically on a user's local storage (i.e., on the mobile device storage, such as memory of a smart phone, tablet, etc.) before they are synchronized with an online, remote or cloud storage. This automated processing of media on the user device may be based on one or more privacy-sensitive conditions being met. For example, if the media is determined to be privacy-sensitive, it is encrypted or obfuscated prior to cloud storage, or the media may be excluded from cloud storage, subject to user review.

Various algorithms may be used to detect factors, e.g., too much exposed skin, recognition of a certain body part or of a certain individual, etc., indicating a characteristic of the image/video appropriateness and thus privacy-sensitive nature of the same. In this way, an embodiment automatically selects privacy-sensitive media content and implements automated encryption or obfuscation of the media content prior to its placement in remote storage.

By way of example, media containing certain people, which may be detected using facial recognition image processing, may be characterized as privacy-sensitive media and thus subject to specialized processing, e.g., encryption. This permits the device user to indicate whom the user wishes to keep private and allows an embodiment to utilize facial recognition and an exclusion list to automate encryption or obfuscation of the media, e.g., prior to synchronizing it with a cloud storage account.

As another example, media may contain a geographical attribute that a user wishes to keep private. For example, a user may wish that all media containing a certain location coordinate (geo tag) be treated as privacy-sensitive. Thus, an embodiment, on detecting such a geographic characteristic, considers this a factor indicating that the media is privacy-sensitive and should be encrypted or obfuscated prior to permitting its movement to a remote storage location via a synchronization process.

An embodiment also may link access to media that is stored in the cloud to the security policy chosen by the user on the local device. That is, an embodiment may apply encryption to media stored locally and online that requires a device-based decryption key for access and thus provides stronger security, e.g., biometrics. This provides an extra layer of privacy protection and permits the user to easily match their personal device security with their cloud content security. For example if user has a weak password for his or her online storage, but has enabled biometric encryption for the device, an embodiment allows, based on the media content, for access to be restricted and controlled even when the media resides on the cloud storage system.

The amount and nature of encryption or obfuscation, as well as the timing, application, and specific implementation thereof may be user defined. For example, a user may be prompted only if privacy-sensitive media is detected and it has been at least temporarily excluded from automatic synchronization to the cloud. In this way, a user may choose if the media is privacy-sensitive, if the privacy sensitive media is to be synchronized, and if the privacy-sensitive media is to be encrypted and/or obfuscated prior to synchronization. For example, an embodiment may operate to prevent media from being included in the synchronization process based on content characteristic detection.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., a camera, a biometric input device such as a fingerprint reader, etc. System 100 often includes a touch screen 170 for data input and display/rendering. System 100 also typically includes various memory devices, for example flash memory 180 and SDRAM 190.

Figure 2:
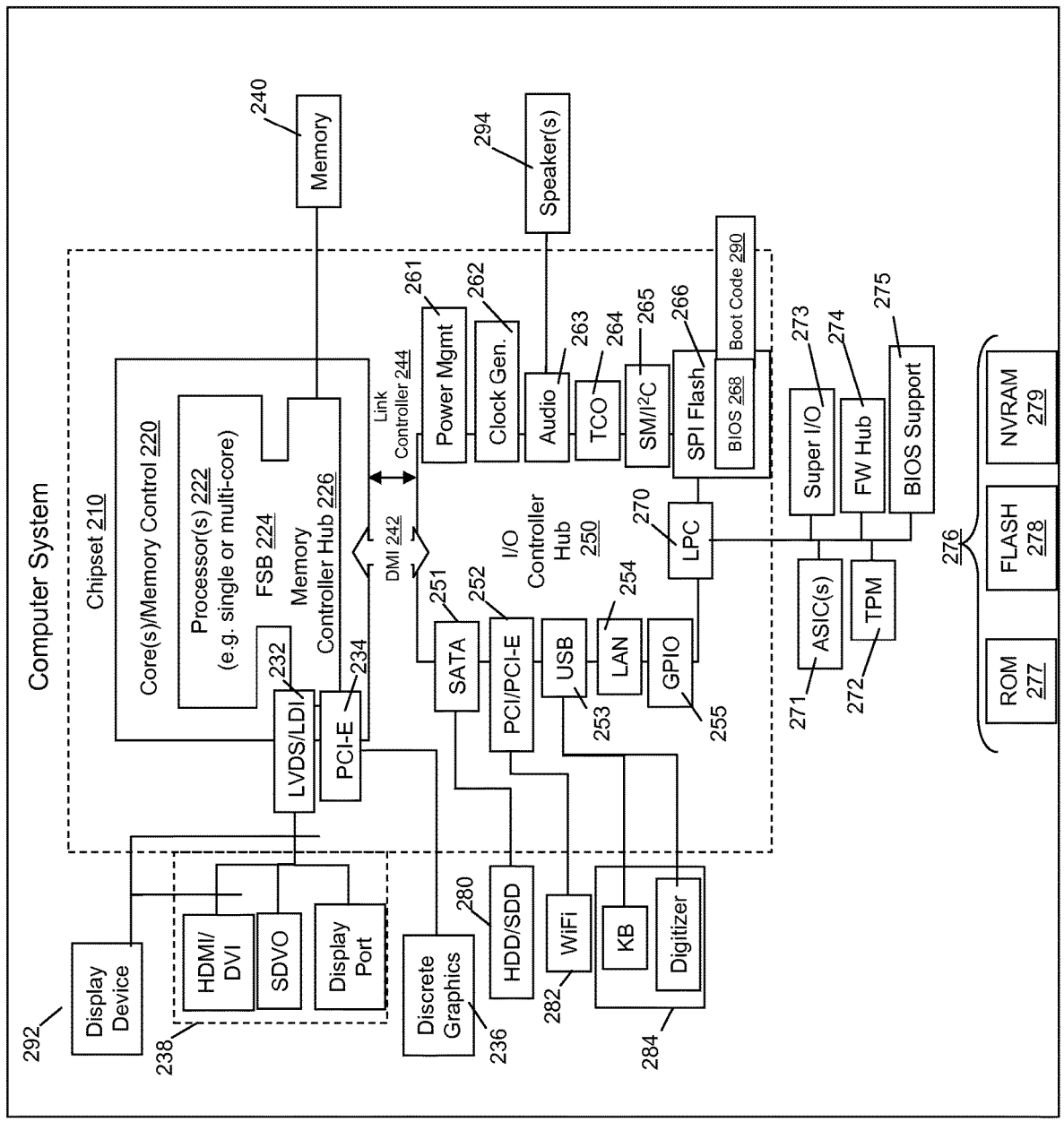
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, biometric input/security devices, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, all of which are referred to herein as mobile end user devices. Users may employ these mobile end user devices for various functions, e.g., producing media files such as images, videos, audio files, documents such as emails, text messages, word processing documents, and the like. For example, the circuitry outlined in FIG. 1 may be implemented in a tablet or smart phone embodiment, whereas the circuitry outlined in FIG. 2 may be implemented in a laptop personal computer embodiment.

Figure 3:
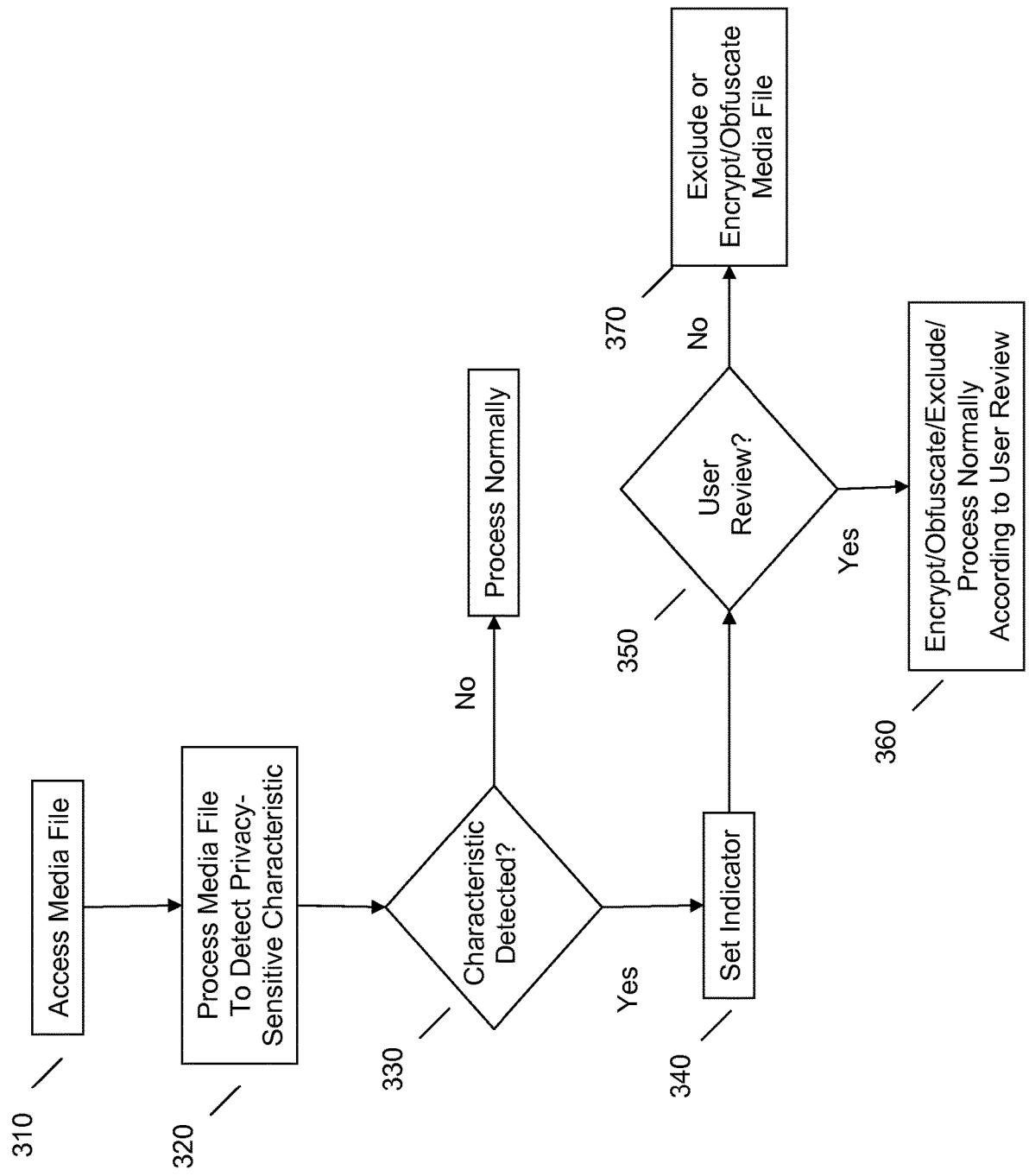
FIG. 3 illustrates an example method of encryption of media based on content.

Referring now to FIG. 3, a user may take a photo or store an image file locally on his or her mobile end user device (e.g., phone, tablet, etc.). Rather than simply copy this image file or photo to the cloud account device as part of an automated or manually initiated synchronization process, an embodiment accesses the media file at 310 prior to the synchronization. An embodiment processes the media file to characterize the media file at 320, e.g., as privacy-sensitive, normal, etc. The characterization and categories may be set by default (e.g., normal media versus privacy-sensitive media) and/or customized by the user (e.g., normal media, always privacy-sensitive media, and privacy-sensitive subject to user review).

Because an embodiment processes the media to characterize it, an embodiment may detect at least one privacy-sensitive characteristic of the media file at 330. As further described herein, this may include examination of the actual content of the media file. By way of specific example, a user may include certain individuals in a privacy or exclusion list such that when facial recognition processing of image content indicates these individuals are present, the media file is subject to additional processing, e.g., exclusion, obfuscation and/or encryption. As another example, an embodiment may use certain standardized parameters, e.g., detection of exposed skin, detection of a body part, detection of sensitive key words or topics, etc., to automatically implement additional or specialized processing with respect to synchronization of the media file. This specialized processing may include, for example, prompting the user for review, automatically encrypting the media file, and/or automatically applying obfuscation (e.g., distorting a face of a user in the media file).

Still further, an embodiment may examine media file content in the form of associated metadata, e.g., geo tags, persons tagged in a photo, etc., that permits additional or specialized processing of the media file. Similar to the media content itself, such metadata may be processed to quickly determine if the media file should be indicated as privacy-sensitive and why, i.e., used for the basis of automated processing such as exclusion, encryption and/or obfuscation.

If a privacy-sensitive characteristic is identified, an embodiment sets an indicator denoting the media file as privacy-sensitive prior to permitting the media file to be stored on a cloud account device at 340. If no such characteristic is detected, the media file may be treated normally, e.g., handled along with the other media files according to a synchronization policy of the mobile OS or third party application, e.g., synchronize all media files at 9 p.m. local time to cloud storage backup.

In an embodiment, the indicator is processed to exclude the media file from cloud synchronization. This may be a temporary exclusion, e.g., subject to user review at 350. By way of example, an embodiment may prompt or notify a user regarding the indicator prior to permitting the media file to be stored on a cloud account device. If a user thereafter responds to the prompt or notification, e.g., as detected at 350, the media file may be processed according to the user review (or lack thereof), as described further herein.

For example, if the prompting occurs after the media file has been excluded from cloud synchronization, the user may be notified thereafter (e.g., in the morning if the synchronization policy was set for overnight synchronization) that certain media files were excluded from the synchronization process, e.g., due to automated detection of a privacy-sensitive characteristic of the media file.

Similarly, an embodiment may automatically encrypt and/or obfuscate the media file, e.g., if no user review is received at 350. This may be done in lieu of not synchronizing the media file along with others. For example, if the user is notified that a privacy-sensitive media file is to be synchronized but no review is forthcoming, an embodiment may default to automatically encrypting and/or obfuscating the media file prior to its storage in the cloud account device 370. Likewise, an embodiment may simply exclude the media file and await user review. The decision of whether to exclude the media file or encrypt/obfuscate it automatically may be set by default and changed by the user. Thus, the media file need not always be automatically encrypted based on the presence of the indicator.

In an embodiment, the encrypting of the media file applies an encryption factor matching an encryption factor used for the mobile end user device. For example, if a user has chosen a biometric encryption factor to secure access to the mobile end user device, e.g., fingerprint reader, facial recognition, etc., the encryption factor used for encrypting the media file may be based on the same encryption/decryption scheme. This permits a matching of the encryption used for privacy-sensitive media stored in the cloud and encryption originally selected by the user for such files, i.e., matching to the on device encryption scheme.

Accordingly, as illustrated by the figures, various embodiments provide added protection or review to certain media files such that a more custom and user driven synchronization scheme is possible. Now, rather than simply synchronizing media in batch mode automatically or requiring the user to review each and every file for inclusion in a cloud synchronization event, an embodiment employs media data processing techniques to indicate or flag potentially privacy-sensitive media for exclusion, further review, and/or encryption/obfuscation prior to its storage off-device, e.g., within a cloud account device of the end user.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions that are executed by a processor and stored on a device readable storage medium, referred to herein as a non-signal storage device. A non-signal storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a non-signal storage device is not a signal, is non-transitory, and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a special purpose information handling device or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    accessing, on a device, a media file;
    processing, using a processor of the device, image data of the media file to characterize the media file as being privacy sensitive or not privacy sensitive, wherein the processing comprises parsing the image data to identify characteristics included in the media file designated as privacy sensitive, wherein the characteristics comprise a geographic attribute and standardized parameters wherein the geographic attribute comprises a location coordinate identified by a user as a location to keep private and wherein the standardized parameters comprises characteristics of the image data identified as privacy sensitive;
    setting an indicator, using the processor, denoting the media file as privacy-sensitive based on the identifying characteristics included in the media file designated as privacy sensitive;
    in an automated synchronization process, notifying a user regarding the indicator prior to permitting the media file to be stored on a cloud account device;
    determining, using the processor, a user response to the notifying is not received within a predetermined time; and
    automatically encrypting or obfuscating the data of the media file prior to permitting the media file to be stored on the cloud account device in the automated synchronization process, wherein the encrypting comprises applying an encryption factor to the media file that matches the encryption factor of the device irrespective of an encryption factor of the cloud account device, wherein the encrypting or obfuscating comprises distorting a face of a user included in the media file.

2. The method of claim 1, wherein the media file is automatically encrypted if it is determined to be privacy sensitive prior to storage in a location selected from the group consisting of local device storage and removable storage.

3. The method of claim 2, wherein the applied encryption factor does not match the encryption factor of the cloud account device.

4. The method of claim 3, wherein the applied encryption factor is a biometric encryption factor.

5. The method of claim 1, wherein the processing comprises processing the media file to recognize a threshold amount of exposed skin.

6. The method of claim 1, wherein the processing comprises image processing.

7. The method of claim 1, wherein the image data that characterizes the media file as being privacy sensitive is selected from the group consisting of: exposed skin, a predetermined body part, sensitive key words, and sensitive topics.

8. A device, comprising:
a network communication device;
a processor coupled to the network communication device;
a memory that stores instructions executable by the processor to:
access, on the device, a media file;
process the image data of the media file to characterize the media file as being privacy sensitive or not privacy sensitive, wherein to process comprises parsing the image data to identify characteristics included in the media file designated as privacy sensitive, wherein the characteristics comprise a geographic attribute and standardized parameters wherein the geographic attribute comprises a location coordinate identified by a user as a location to keep private and wherein the standardized parameters comprises characteristics of the image data identified as privacy sensitive;
thereafter set an indicator denoting the media file as privacy-sensitive based on the identifying characteristics included in the media file designated as privacy sensitive;
in an automated synchronization process, notify a user regarding the indicator prior to permitting the media file to be stored on a cloud account device;
determine a user response to a notification of the indicator is not received within a predetermined time; and
automatically encrypt or obfuscate the data of the media file prior to permitting the media file to be stored on the cloud account device in the automated synchronization process, wherein the encrypting comprises applying an encryption factor to the media file that matches the encryption factor of the device irrespective of an encryption factor of the cloud account device, wherein the encrypting or obfuscating comprises distorting a face of a user included in the media file.

9. The device of claim 8, wherein the media is automatically encrypted if it is determined to be privacy sensitive prior to storage in a location selected from the group consisting of local device storage and removable storage.

10. The device of claim 9, wherein the applied an encryption factor does not match the encryption factor of the cloud account device.

11. The device of claim 10, wherein the applied encryption factor is a biometric encryption factor.

12. The device of claim 8, wherein processing the data of the media file comprises processing the media file to recognize a threshold amount of exposed skin.

13. The device of claim 8, wherein processing the data of the media file comprises image processing.

14. A product, comprising:
a storage device having code stored therewith, the code being executable by a processor of a device and comprising:
code that accesses, on a device, a media file;
code that processes image data of the media file to characterize the media file as being privacy sensitive or not privacy sensitive, wherein the code that processes comprises code that parses the image data to identify characteristics included in the media file designated as privacy sensitive, wherein the characteristics comprise a geographic attribute and standardized parameters wherein the geographic attribute comprises a location coordinate identified by a user as a location to keep private and wherein the standardized parameters comprises characteristics of the image data identified as privacy sensitive;
code that thereafter sets an indicator, using the processor, denoting the media file as privacy-sensitive based on the identifying characteristics included in the media file designated as privacy sensitive;
code that, in an automated synchronization process, notifies a user regarding the indicator prior to permitting the media file to be stored on a cloud account device;
code that determines a user response to a notification of the indicator is not received within a predetermined time; and
code that automatically encrypts or obfuscates the data of the media file prior to permitting the media file to be stored on the cloud account device in the automated synchronization process, wherein the encrypting comprises applying an encryption factor to the media file that matches the encryption factor of the device irrespective of an encryption factor of the cloud account device, wherein the encrypting or obfuscating comprises distorting a face of a user included in the media file.

\* \* \* \* \*